US008910303B2

(12) United States Patent
Su et al.

(10) Patent No.: US 8,910,303 B2
(45) Date of Patent: Dec. 9, 2014

(54) SYSTEM AND METHOD FOR MANIPULATING SECURITY OF INTEGRATED CIRCUIT LAYOUT

(75) Inventors: Yi-Jen Su, Hsinchu (TW); Ying-Sung Huang, Hsinchu (TW)

(73) Assignee: Anaglobe Technology, Inc., Hsinchu (TW)

( * ) Notice: Subject to any disclaimer, the term of this patent is extended or adjusted under 35 U.S.C. 154(b) by 14 days.

(21) Appl. No.: 13/461,052

(22) Filed: May 1, 2012

(65) Prior Publication Data
US 2013/0298262 A1 Nov. 7, 2013

(51) Int. Cl.
  G06F 21/00 (2013.01)
  G06F 21/51 (2013.01)
  G06F 21/76 (2013.01)
(52) U.S. Cl.
  CPC .............. *G06F 21/51* (2013.01); *G06F 21/76* (2013.01)
  USPC ................... 726/28; 726/26; 726/27; 726/30; 705/59; 716/106; 716/136
(58) Field of Classification Search
  CPC ................................. G06F 21/51; G06F 21/76
  USPC .................. 726/26–2, 30, 308; 716/106, 136; 705/59
  See application file for complete search history.

(56) References Cited

U.S. PATENT DOCUMENTS

| | | | |
|---|---|---|---|
| 6,049,789 A * | 4/2000 | Frison et al. | 705/59 |
| 7,024,640 B2 * | 4/2006 | Buchanan | 716/112 |
| 7,496,884 B2 * | 2/2009 | Fang et al. | 716/51 |
| 7,698,662 B1 * | 4/2010 | Wu et al. | 716/104 |
| 8,046,730 B1 * | 10/2011 | Ferguson et al. | 716/139 |
| 8,312,410 B2 * | 11/2012 | Foster et al. | 716/136 |
| 8,453,136 B1 * | 5/2013 | Hahn et al. | 717/168 |
| 2003/0005394 A1 * | 1/2003 | Buchanan | 716/4 |
| 2003/0140255 A1 * | 7/2003 | Ricchetti et al. | 713/201 |
| 2009/0007031 A1 * | 1/2009 | Ginetti et al. | 716/4 |

* cited by examiner

*Primary Examiner* — Yin-Chen Shaw
(74) *Attorney, Agent, or Firm* — Muncy, Geissler, Olds & Lowe, P.C.

(57) ABSTRACT

A method for manipulating security of an integrated circuit layout, comprising: rendering a PCell that is created by an original user for a successive user; providing an open access to the PCell; providing a PCell evaluator to execute evaluating steps of: getting license information from the PCell, and checking the PCell license information; and generating a layout of a sub-master by instantiating a super-master of the PCell if the PCell license information is valid, or leave the sub-master empty in a PCell view if the PCell license information is invalid.

9 Claims, 4 Drawing Sheets

SYSTEM AND METHOD FOR MANIPULATING SECURITY OF INTEGRATED CIRCUIT LAYOUT

FIELD OF THE INVENTION

The present invention relates to a system and method for constructing variations from an integrated circuit layout, and more particularly, to a system and method for manipulating security of an integrated circuit layout.

DESCRIPTION OF THE PRIOR ART

Parameterized cell (PCell) is used widely in the automated design of analog (or custom digital) electronic circuits. A PCell is a cell which is automatically generated by electronic design automation (EDA) software based on the value of its governing parameters. Hence, a PCell represents a component of the circuit that is dependent on parameters and is not a fixed element.

In electronic circuit designs, cells are basic units of functionality. A given cell may be "placed," or "instantiated," many times. A PCell is more flexible than a non-parameterized cell because different instances may have different parameter values; for example, rather than have many different cell definitions to represent the variously sized transistors in a given design, a single PCell may take a transistor's dimensions (width and length) as parameters. Different instances of a single PCell can then represent transistors of different sizes, but otherwise similar characteristics.

The structures within an integrated circuit and the rules (design rules) governing their physical dimensions are often complex making the structures tedious to draw by hand. By using PCells a circuit designer can easily generate a large number of various structures that only differ in a few parameters, thus increasing design productivity and consistency.

Most often, PCell implies a Physical PCell—a physical (layout) representation (drawing) of an electronic component, showing the physical structure of the latter inside an integrated circuit (IC). Although most PCells are physical (layout) PCells, a PCell is not limited in functionality or scope to only represent physical structures inside the IC. Device symbols in circuit schematics may also be implemented as PCells.

Underlying characteristics of all PCells are: 1. dependence on (input) parameters; and 2. ability to generate design data based on the latter parameters.

Hence, a PCell is a piece of programming code, and is responsible of the process of creating the proper structure of the PCell variants based on its (input) parameters. For the example of a Physical (layout) PCell, this code generates (draws) the actual shapes of the (mask design data) that comprise the circuit.

Since one piece of PCell code can create many different objects (with different parameter values), it is referred to as a PCell Master. The object/shapes/data that this code creates is called an instance of the PCell. Typically, one Master PCell produces many (1) instances/variants.

As to a software license (or software license in commonwealth usage), it is a legal instrument (usually by way of contract law) governing the usage or redistribution of software. All software is copyright protected, except material in the public domain. Contractual confidentiality is another way of protecting software. A typical software license grants an end-user permission to use one or more copies of software in ways where such a use would otherwise potentially constitute copyright infringement of the software owner's exclusive rights under copyright law.

Some software comes with the license when purchased off the shelf or an OEM license when bundled with hardware. Software can also be in the form of freeware or shareware. Software licenses can generally be fit into the following categories: proprietary licenses and free and open source licenses, which include free software licenses and other open source licenses. The features that distinguish them are significant in terms of the effect they have on the end-user's rights.

A free open source license makes software free for inspection of its code, modification, and distribution. Some[citation needed] free licenses, such as the GNU General Public License (GPL), allow the product and/or derivative to be commercially sold.

However, there is the requirement to manipulating security of the PCell code to prevent the intelligent property of the circuit designer from being infringed.

SUMMARY OF THE INVENTION

The present invention aims to manipulate security of the PCell code to prevent the intelligent property of the circuit designer from being infringed.

One embodiment of the present invention provides a method for manipulating security of an integrated circuit layout, comprising: rendering a PCell that is created by an original user for a successive user; providing an access to the PCell from an OpenAccess database; providing a PCell evaluator to execute evaluating steps of: getting a PCell license information from the PCell, and checking the PCell license information; and generating a layout of a sub-master by instantiating a super-master of the PCell if the PCell license information is valid, or leave the sub-master empty in a PCell view if the PCell license information is invalid.

Another embodiment of the present invention provides a method further comprising providing a PCell security control utility for the original user to provide the option of requesting checking the PCell license information when the PCell evaluator executes the evaluating steps.

Another embodiment of the present invention provides a method further comprising charging the original user when the original user chooses to request checking the PCell license information.

Another embodiment of the present invention provides a method further comprising providing a text field in a compile form for the original user to enter a feature name.

Another embodiment of the present invention provides a method further comprising providing a PCell security control utility for the original user to compute a check sum value or a signature of the super-master, and stores the check sum value or the signature in the super-master.

Wherein the PCell evaluator computes the check sum value or the signature of the super-master to compare with the check sum value or the signature stored in the super-master when the PCell evaluator executes the evaluating steps.

Another embodiment of the present invention provides a method further comprising caching the check sum value or the signature of the super-master by the PCell evaluator to prevent re-computation.

Another embodiment of the present invention provides a method further comprising prompting an alert when a shape or an instance found in the PCell view to prevent a layout view of the layout of the sub-master from being delivered.

Wherein the PCell license information further comprises: a host ID, a feature name, or an expiry date.

Another embodiment of the present invention provides a system for manipulating security of an integrated circuit layout, comprising: an application programming interface to render a PCell that is created by an original user for a successive user, and provide an access to the PCell from an OpenAccess database; a PCell evaluator to execute evaluating steps of: getting license information from the PCell, and checking the PCell license information; and a layout generator to generate a layout of a sub-master by instantiating a super-master of the PCell if the PCell license information is valid.

Another embodiment of the present invention provides a system further comprising a PCell security control utility to provide the original user with the option of requesting checking the PCell license information when the PCell evaluator executes the evaluating steps.

Wherein the PCell evaluator charges the original user when the original user chooses to request checking the PCell license information.

Another embodiment of the present invention provides a system further comprising a compile form with a text field for the original user to enter a feature name.

Another embodiment of the present invention provides a system further comprising a PCell security control utility for the original user to compute a check sum value or a signature of the super-master, and stores the check sum value or the signature in the super-master.

Wherein the PCell evaluator computes the check sum value or the signature of the super-master to compare with the check sum value or the signature stored in the super-master when the PCell evaluator executes the evaluating steps.

Wherein the PCell evaluator may cache the check sum value or the signature of the super-master by the PCell evaluator to prevent re-computation.

Another embodiment of the present invention provides a system further comprising a PCell view prompting an alert when a shape or an instance found in the PCell view to prevent a layout view of the layout of the sub-master from being delivered. Wherein the PCell license information further comprises: a host ID, a feature name, or an expiry date.

BRIEF DESCRIPTION OF THE DRAWINGS

The primitive objectives and advantages of the present invention will become apparent upon reading the following description and upon reference to the accompanying drawings in which.

DESCRIPTION OF THE PREFERRED EMBODIMENT

Preferred embodiments and aspects of the invention will be described to explain the scope, structures and procedures of the invention. In addition to the preferred embodiments of the specification, the present invention can be widely applied in other embodiments.

All of the material in the U.S. Pat. No. 7,222,321, filed by the identical assignee, is cited herein for reference. The system for manipulating an integrated circuit layout may include an object extractor for identifying primitive objects in a geometric layout to generate a first symbolic layout based on the criteria of a technology file, a nester for nesting a plurality of primitive objects to generate a first virtual device in the first symbolic layout, a recognizer for associating first virtual devices in first symbolic layout to generate a second symbolic layout, an optimizer for optimizing the second symbolic layout to generate a third symbolic layout. The object extractor is configured to identify the primitive object in the geometric layout based on the primitive object model that was taken from the technology file, which identifies the parameters and constraints of primitive objects. To manipulating the security of the integrated circuit layout, a PCell security control utility may be provided for the original user, and the original user may choose the option of requesting checking the PCell license information when the PCell evaluator executes the evaluating steps after the PCell is delivered to a successive user.

Furthermore, when the original user chooses to request checking the PCell license information, the original user tends to charge the successive user, and it is also the opportunity for the system to charge the original user. The present invention introduces the software license control on IP via PCell security control. The software provider assist the IP provider to control the license to their client, namely, the OP user. By using the PCell evaluation mechanism, the present PCell evaluator accesses PCell data license information such as feature name, number of concurrent users, expiration date for requesting the permission from the license manager. The system and corresponding functional diagram mat refer to the U.S. Pat. No. 7,222,321.

Figure 1:
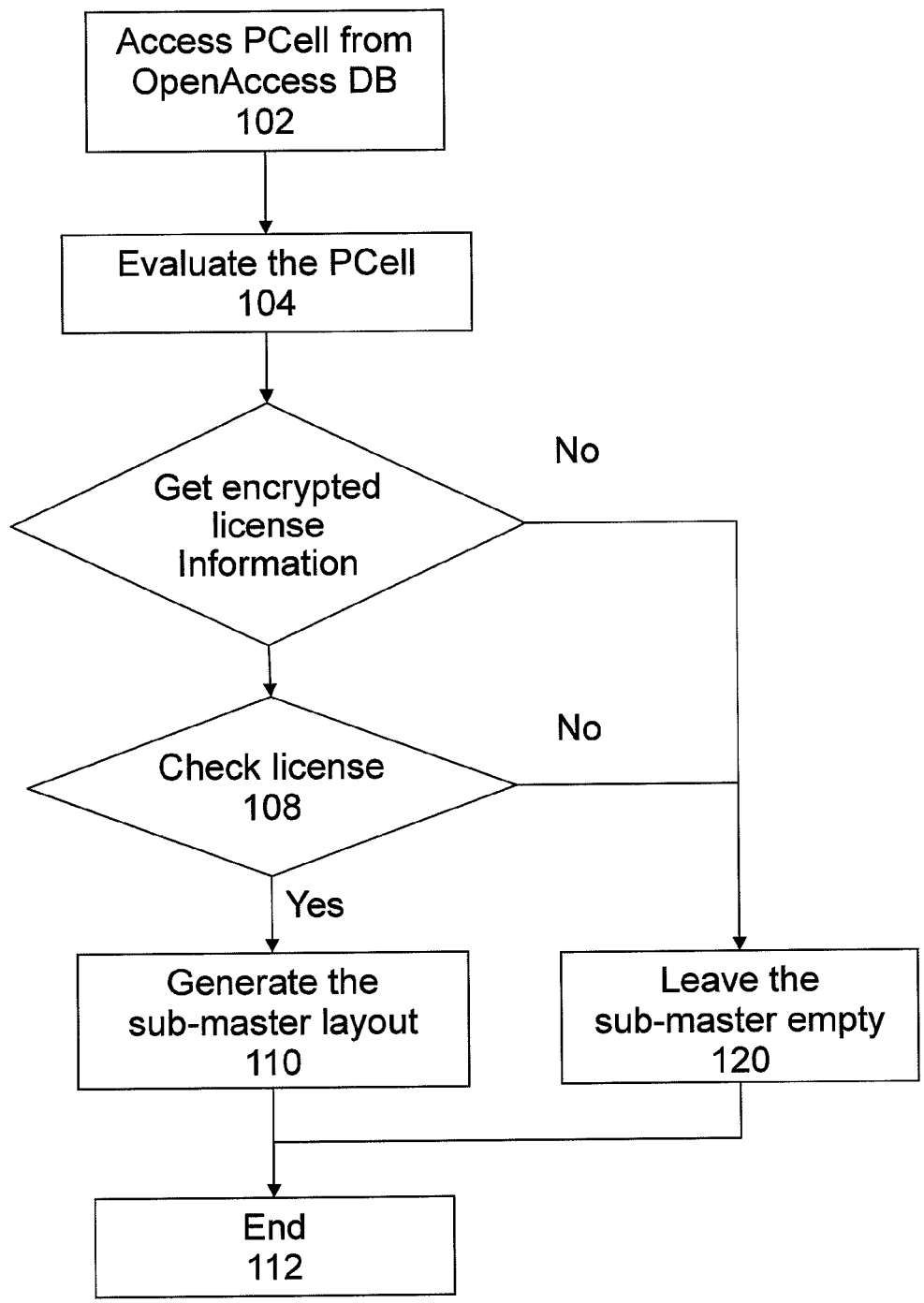
FIG. 1 shows the flow of PCell evaluation with license control according to one embodiment of the present invention.

FIG. 1 shows the flow of PCell evaluation with license control after the PCell is delivered to a successive user comprising the steps of: rendering a PCell that is created by an original user for the successive user by application programming interface (API) 302, and providing an access to the PCell from an OpenAccess database (step 102), subsequently. In step 104, please also refer to FIG. 3, a PCell evaluator is provided to evaluating the PCell comprising evaluating steps of getting license information from the PCell (step 106), and checking the PCell license information (step 108). If the PCell license information is valid, a layout of a sub-master is generated by instantiating a super-master of the PCell (step 110), or if the PCell license information is invalid, leave the sub-master empty in a PCell view (step 120). To completely prevent the PCell license information, the PCell license information may be encrypted.

Alternatively, before the PCell is delivered to the successive user, the PCell security control utility for the original user may provide a text field in a compile form for the original user to enter a feature name, and may compute a check sum value or a signature of the super-master, and stores the check sum value or the signature in the super-master.

And, after the PCell is delivered to the successive user and the successive user use the system of the present invention to access the PCell, the PCell evaluator of the system of the present invention computes the check sum value or the signature of the super-master to compare with the check sum value or the signature stored in the super-master when the PCell evaluator executes the evaluating steps. Further, the PCell evaluator may cache the check sum value or the signature of the super-master to prevent re-computation.

The system of the present invention may prompt that a layout view is not recommended to be delivered to customers, and the PCell view is recommended keeping empty when the PCell view is opened.

Further, the PCell view may prompt an alert to prevent a layout view of the layout of the sub-master from being delivered.

Figure 2:
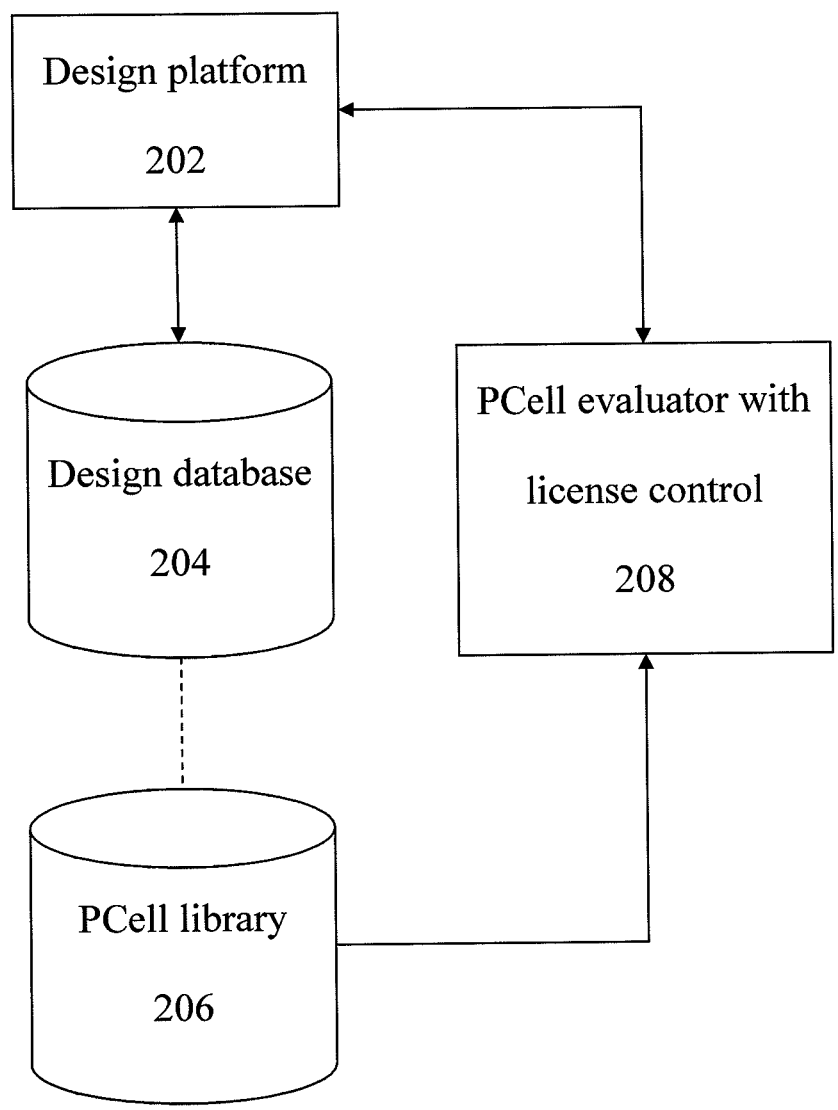
FIG. 2 illustrates the architecture of PCell evaluation with license control according to one embodiment of the present invention.

FIG. 2 illustrates the architecture of PCell evaluation with license control according to one embodiment of the present invention, wherein the PCell license information in a license file may comprise: host ID, feature name, expiry date.

Wherein the design platform 202 could be the interface used by the programmer, such as the PCell view, and the design platform 202 is the place to show the alert.

The design database 204 provides the data to the design platform 202, when the programmer calls or revokes the data, or provides the space to store the data created in the design platform 202.

As to PCell library 206, the elements stored thereto may be provided to design database 204 without the security controlling or may be provided to the design platform 202 with the security controlling made by the PCell evaluator.

When the sub-master is created after the license control of the PCell evaluator, the PCell library 206 will be copied to a new one, with some encrypted information inside each PCell to identify who is the owner (for example, from libgm_builder.h), and who are allowed to use the PCells. For those who are not the allowed customers, the contents of sub-masters are always empty, i.e., no evaluations.

Figure 3:
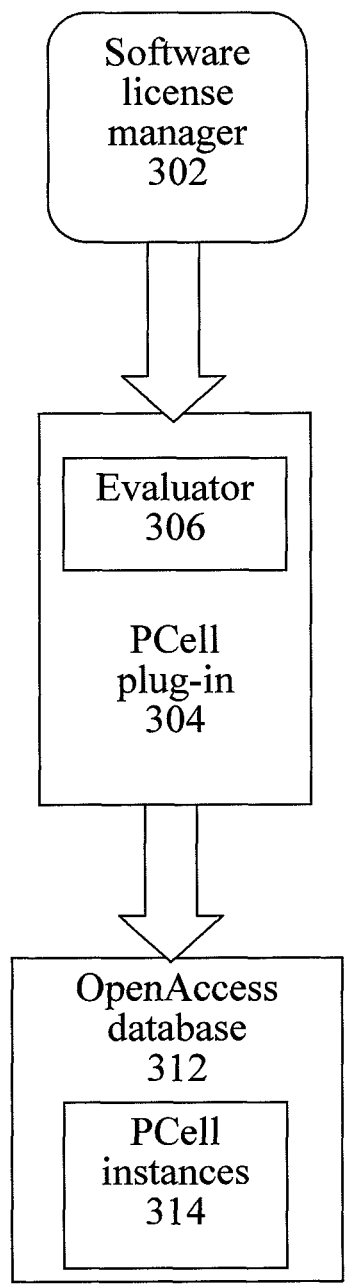
FIG. 3 illustrates the system of PCell evaluation with license control according to one embodiment of the present invention.

FIG. 3 illustrates the system of PCell evaluation with license control according to one embodiment of the present invention. The PCell Code 302 is coupled to the plug-in 304 for an application programming interface (API) 302 and a PCell evaluator 306. The plug-in 304 is coupled with an OpenAccess database 312.

After the PCell Code 302 is entered into the plug-in 304, the application programming interface (API) 302 renders a PCell that is created by an original user for a successive user and provide an access to the PCell from the OpenAccess database 312, and the PCell evaluator 306 executes evaluating steps of getting license information from the PCell and checking the PCell license information.

If the PCell license information is valid, a layout generator generates a layout of a sub-master by instantiating a super-master of the PCell, i.e., generates PCell instances 314.

Figure 4:
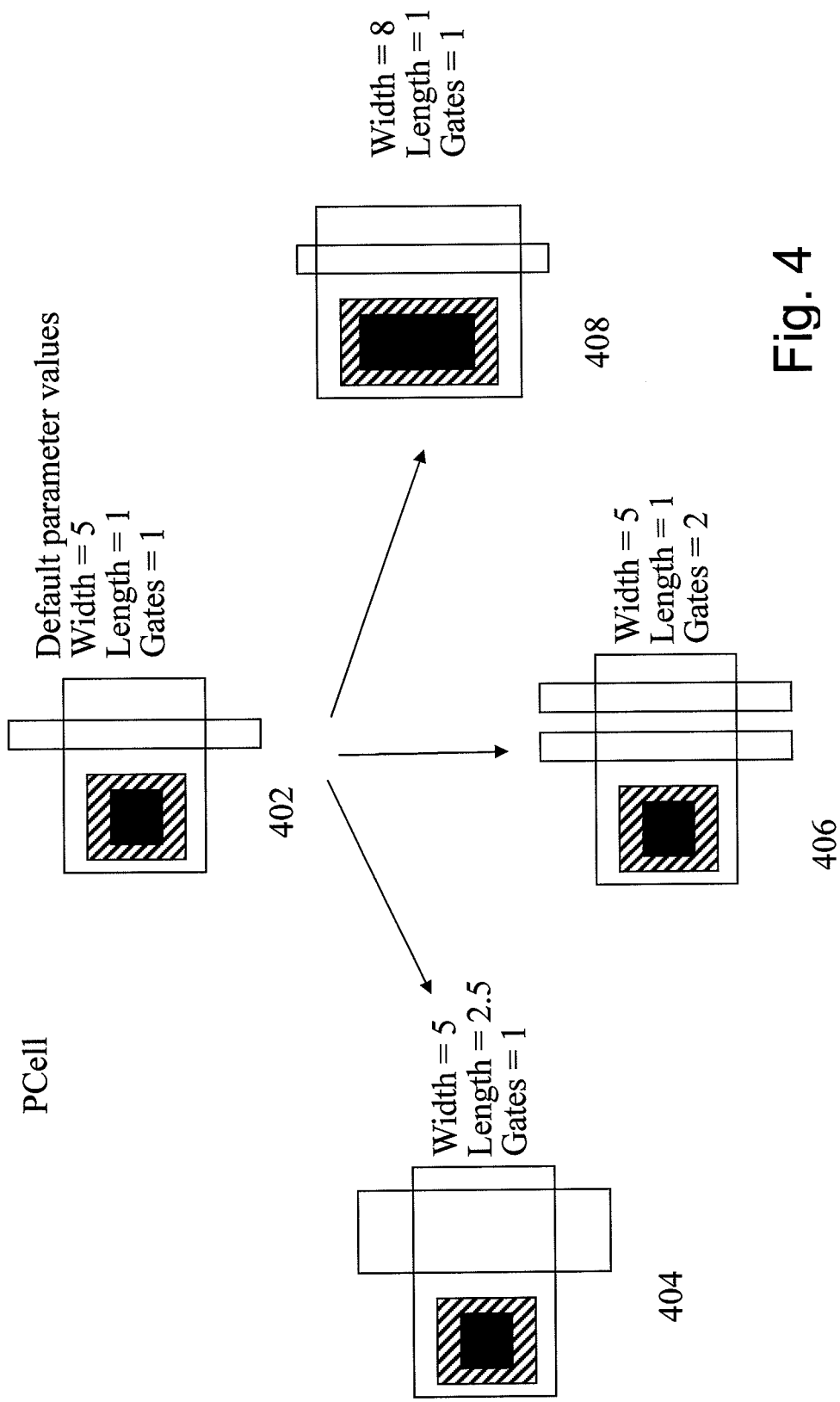
FIG. 4 shows the diagram generating layouts of sub-masters by instantiating a super-master of the PCell if the PCell license information is valid according to one embodiment of the present invention.

FIG. 4 shows the diagram generating layouts of sub-masters by instantiating a super-master of the PCell if the PCell license information is valid according to one embodiment of the present invention.

The original user may define parameters and evaluator info in the super-master 402, and may instantiate the super-master 402 with various parameters to trigger the PCell evaluator to generate sub-masters (404, 406, 408).

The above-described embodiments of the present invention are intended to be illustrative only. Numerous alternative embodiments may be devised by those skilled in the art without departing from the scope of the following claims.

What is claimed is:

1. A method for manipulating security of an integrated circuit layout, comprising:
   rendering a PCell that is created by an original user for a successive user;
   providing an access to the PCell from a database;
   providing a PCell evaluator to execute evaluating steps of:
      getting a PCell license information from the PCell, and deciding accessing rights of the successive user by checking the PCell license information to determine a license type;
      computing a check sum value or a signature of a super-master for the successive user; and
      comparing the checksum value or the signature to a check sum or a signature of the super-master for the original user;
   generating a layout of a sub-master by instantiating the super-master of the PCell when the PCell license information is valid and when there is a match of the check sum or the signature of the super-master, and
   preventing the sub-master from delivering in a PCell view when the PCell license information is invalid or when there is a mismatch of the check sum value or the signature of the super-master.

2. The method of claim 1, further comprising providing a PCell security control utility for the original user to provide the option of requesting checking the PCell license information when the PCell evaluator executes the evaluating steps.

3. The method of claim 2, further comprising charging the original user when the original user chooses to request checking the PCell license information.

4. The method of claim 1, further comprising providing a text field in a compile form for the original user to enter a feature name.

5. The method of claim 1, further comprising providing a PCell security control utility for the original user to compute the check sum value or the signature of the super-master, and stores the check sum value or the signature in the super-master.

6. The method of claim 1, further comprising caching the check sum value or the signature of the super-master by the PCell evaluator to prevent re-computation.

7. The method of claim 1, further comprising prompting an alert to prevent a layout view of the layout of the sub-master from being delivered.

8. The method of claim 1, wherein the PCell license information further comprises: a host identification (ID), a feature name, or an expiry date.

9. The method of claim 1, wherein the database is an OpenAccess database.

* * * * *